INVENTORS
PHILIP H. SNOBERGER
OSKAR H. BUSCHMANN
BY
ATTORNEY

INVENTORS
PHILIP H. SNOBERGER
OSKAR H. BUSCHMANN
BY
ATTORNEY

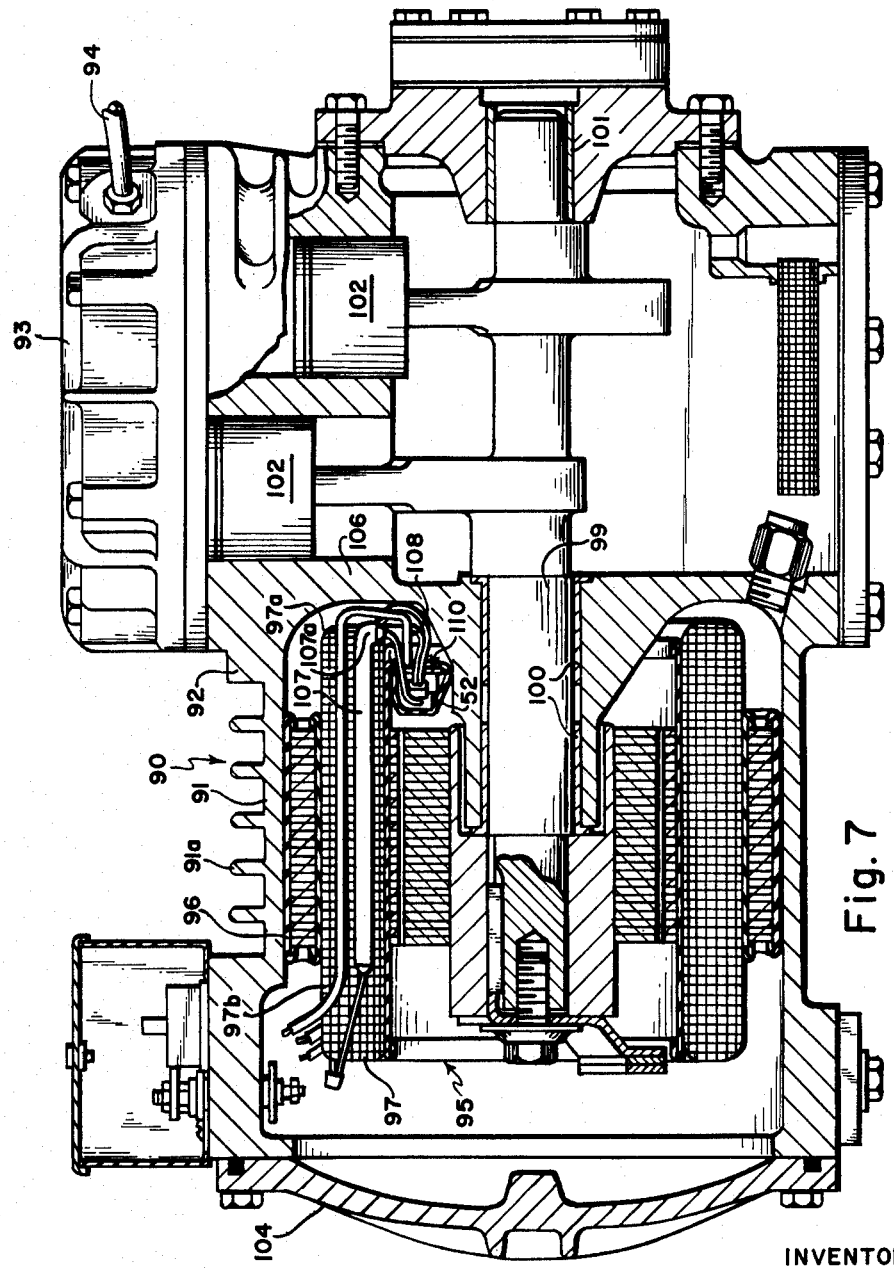

United States Patent Office 3,222,555
Patented Dec. 7, 1965

3,222,555
MOTOR PROTECTION MEANS FOR HERMETICALLY SEALED MOTOR-COMPRESSOR UNITS
Philip H. Snoberger, Orange, Conn., and Oskar H. Buschmann, Sidney, Ohio; said Snoberger assignor to Ranco Incorporated, Columbus, Ohio, a corporation of Ohio
Filed Mar. 6, 1962, Ser. No. 177,778
5 Claims. (Cl. 310—68)

This invention relates to improvements in means for protecting hermetically sealed electric motors, such as form part of sealed motor compressor units of the type used in refrigeration systems which are cooled in part by refrigerant circulating through the unit, against overheating due to overloading, locked rotor conditions, voltage supplies differing from rated voltages of the motor, loss of refrigerant charge, and the like.

It has been proposed heretofore to provide a protector for open type electric motors comprising a switch actuated by a fluid filled expansible thermally responsive element including a metal tube or bulb containing a thermally sensitive fluid and located to be responsive to the temperature in a portion of the motor winding and to also have motor current passing through the walls of the bulb or element, the metal thereof being of a character to create resistive heat more or less proportional to the degree of overload so that the protective device could respond to either locked rotor conditions or gradual or running overload conditions.

In the case of electric motors forming part of refrigeration type motor-compressor units, the motor windings may be cooled to a greater or lesser degree by the refrigerant flowing thereabout on its return to the compressor and, for a given load on the motor, the windings may remain at safe temperatures due to such cooling action but may at other times tend to be overheated under the same load because of a reduction in flow of refrigerant. Moreover, refrigerant sometimes collects in liquid form in the motor-compressor unit so that some windings are actually submerged while others are not, thereby causing a wide variance in the temperature of different parts of the winding. In other instances portions of the windings develop "hot-spots" due to proximity to the cylinders of the compressor section of an air-cooled motor-compressor unit. Obviously, the previously mentioned forms of protective devices are relatively insensitive to the actual temperature and load conditions of the interior of the windings under the conditions described and do not afford adequate or proper protection for the motor.

Accordingly, it is a broad object of this invention to provide a more effective and reliable motor protection means for hermetically sealed motors of motor-compressor units, the protection means including a hermetically sealed motor control switch adapted to be located within the motor housing and to be actuated by the thermal expansion of fluid within an electrical current conducting tubular element which actually forms at least a part of a turn of the windings carrying the motor current and which element is surrounded by, or in intimate contact with, the adjoining turns of the winding so as to be subjected both to substantially the same resistive electrical heating effects and the same heat transfer conditions as the adjoining winding turns.

It is a more specific object of the present invention to provide motor protection means of the above mentioned character, in combination with an electric motor having stator windings, at least part of one turn of which comprises a temperature sensing tubular element in the form of liquid filled metallic tubing operatively connected to a cut-out switch and having substantially the same current carrying characteristics as the wire turns of the windings so that temperature increases in the tubing due to the resistance to current flow, at least match the temperature increases of the wire due to current flow, and wherein the central portion of the tubing is preferably wound into a winding slot in the winding supporting structure of the motor and is disposed beneath or buried by the other turns in that slot. In one form of the invention an end portion of the tubing follows the course of the end turns of the winding and are buried therein so that the tubing is in intimate contact with the interior of different portions of the winding having different temperature conditions.

As another object, the invention aims to provide protection means for motor-compressor motor windings parts of which at times experience wide differences in temperature, for example, when partly submerged in refrigerant collected in the motor-compressor unit housing, the protection means comprising a plurality of motor current carrying tubular temperature sensing elements containing thermally expansible liquid and operably connected in series to a protector switch, the sensing elements being buried in different portions of the windings and being independently responsive to inordinate temperatures to effect opening of the protector switch.

Other objects and advantages of this invention will be apparent from the following detailed description of preferred embodiments thereof, and from the accompanying sheets of drawings forming a part of this specification, and in which FIG. 1 is a vertical sectional view of a motor compressor unit having an electric motor embodying the protection means of this invention;

FIG. 7 is a sectional view of a horizontal form of motor-compressor unit embodying the invention.

Although the invention may be embodied in other types of electric motors in sealed housings, the invention is herein described with reference to induction motors forming part of hermetically sealed motor-compressor units such as may be used in refrigerators, air conditioning units, and the like.

Figure 1:
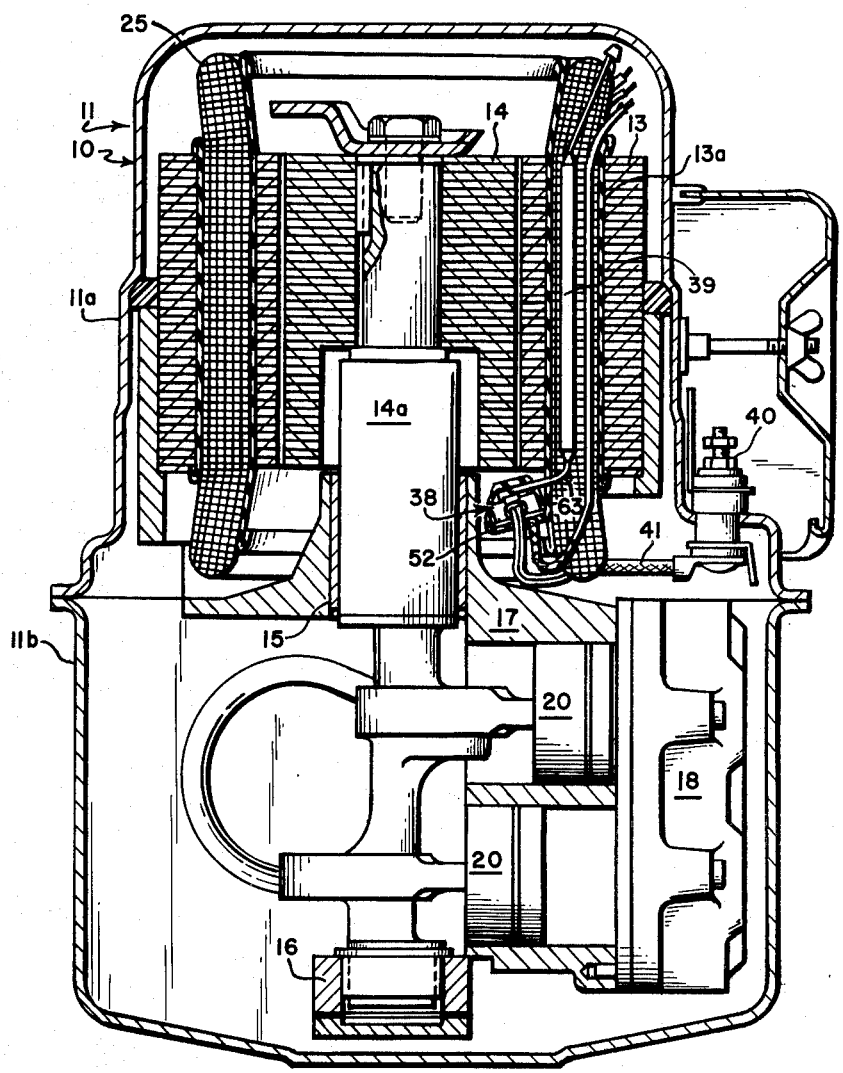
Figure 2:
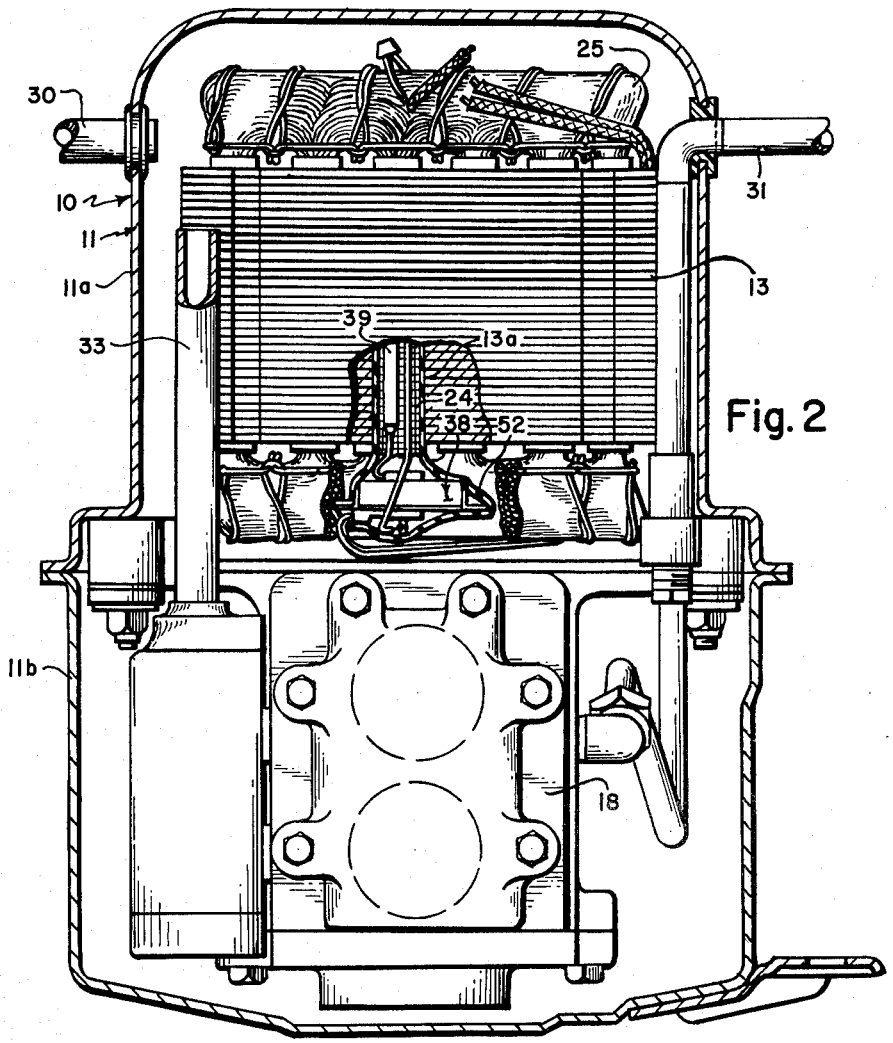
FIG. 2 is a view, partly in section and partly in elevation of the motor-compressor unit of FIG. 1 viewed from the right side.
Figure 3:
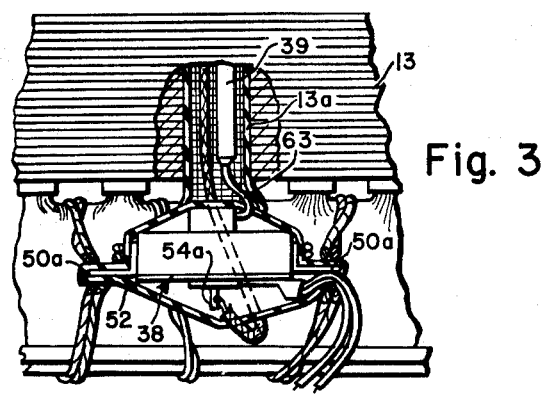
FIG. 3 is an enlarged fragmentary view illustrating the mounting of the protector switch in the motor section.

In the form of the invention illustrated in FIGS. 1, 2, and 3, an electric-motor-compressor unit is generally indicated at 10 and includes an hermetically sealed housing 11 having a motor containing section 11a and a compressor containing section 11b. Within motor section 11a is disposed an induction motor 12 comprising a stator 13 and a rotor 14. The rotor 14 comprises an output shaft 14a suitably journaled in bearings 15 and 16 in a frame 17 of a compressor 18. Shaft 14a is provided with eccentrics 14b disposed in housing section 11b for operation of pistons 20 of refrigerant compressor 18.

The illustrated motor 12 is of a conventional four pole, split-phase, induction type and the stator 13 comprises a laminated pole member which provides the supporting structure for stator windings 24. The windings 24 are formed principally of wire wound in a conventional manner in slots 13a, formed in the laminated pole member, and have the usual insulation separating each loop or turn of the winding from the others. The portions 25 of the windings which run along the ends of the stator between winding slots are termed "end turns" in the motor art and will hereafter be referred to as end turns 25, for convenience, though it is understood that they each form part of the windings 24. In the present instance, the stator includes running windings, represented at 24 in FIG. 5, and a starting winding 26, of conventional split phase type. Energization of these windings, which are more fully described hereinafter, causes rotor 14 to turn and effect reciprocation of pistons 20 of compressor 18.

The motor compressor unit 10 comprises inlet and outlet tubes 30 and 31, respectively (FIG. 2), the former tube opening directly into the upper part of housing section 11a, and the latter tube being connected to the suction side of compressor 18. Tube 30 is adapted to be connected to the evaporator of a refrigeration system (not shown) and serves to return vaporized refrigerant to the housing. Compressor 18 is provided with an intake passage formed by a stand-pipe 33. Pipe 33 prevents the induction of liquified refrigerant by the compressor in the event an accumulation of liquid refrigerant collects in the housing 11.

Outlet tube 31 is adapted to be connected to the condenser portion of a refrigeration system and supplies hot, compressed refrigerant gas thereto, all as is well understood by those skilled in the art to which the invention pertains.

As may be seen from FIG. 2, the returning refrigerant from tube 30 is permitted to circulate about the motor 12 within the housing and aids in cooling the motor widings.

The conditions under which the refrigerant circulates through the refrigerating system cause the amount and temperature of refrigerant returning to the motor-compressor unit 10 to vary considerably. Accordingly, for a given load on the motor the windings may remain at safe temperatures because of the cooling effect of the refrigerant thereon, but at times may tend to become dangerously overheated under the same load because of a reduction in flow of returning refrigerant. Moreover, at times the mentioned accumulation of liquid refrigerant in housing 11 causes part of windings 24 to be immersed and effectively cooled while the remaining parts are subjected to overheating because of the paucity of refrigerant being circulated as a gas.

Figure 5:
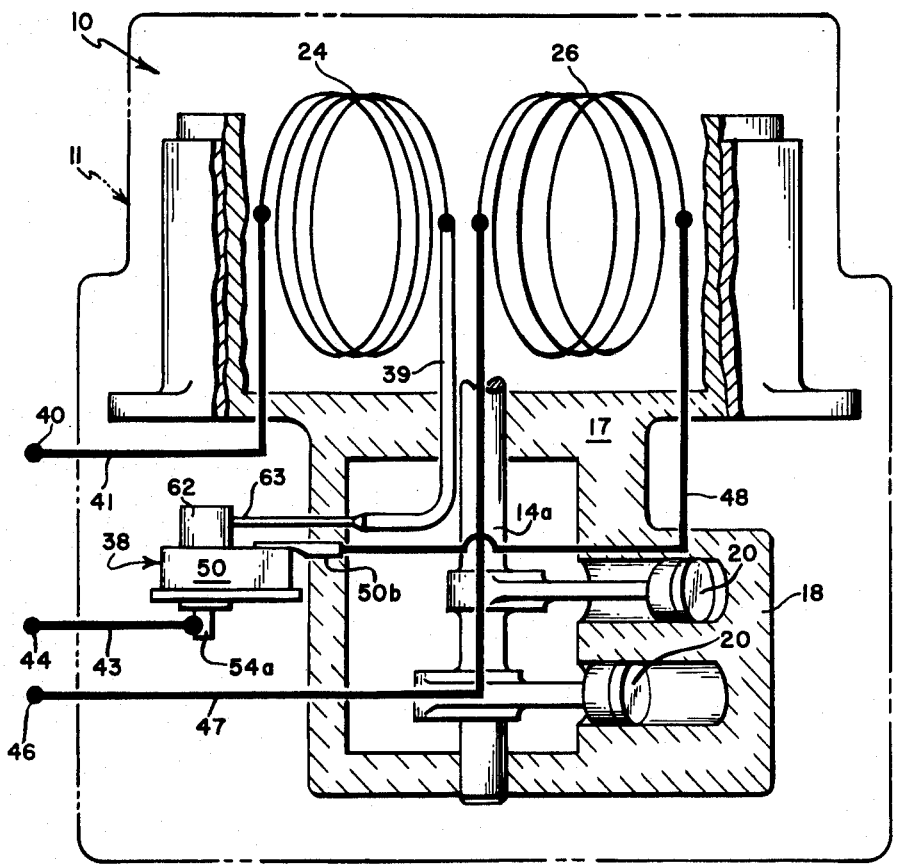
FIG. 5 is a schematic diagram illustrating the electrical connection of the protector switch in the motor circuit.

In motor-compressor units embodying the present invention likelihood of damage is eliminated by the inclusion of novel thermal protection means. Thus, both the running windings 24 and the starting winding 26 are connected for energization through a normally closed thermally actuated protector switch generally indicated at 38. A protector switch actuating temperature sensing element, in the form of a tubular member 39 containing a liquid which expands and contracts with increases and decreases in temperature, is connected to switch 38 for actuation thereof and actually forms a part of the running windings 24, as will be more fully explained as the description proceeds. Referring to FIG. 5, a circuit for the running windings 24 may be traced from a running winding terminal 40 through conductor 41, winding 24 (which includes tubular member 39), normally closed switch 38 and conductor 43 to a common terminal 44. A circuit for the energization of starting winding 26 may be traced from a starting winding terminal 46 through conductor 47, winding 26, conductor 48, protector switch 38 and common conductor 43 to common terminal 44.

Suitable electric power, such as 115 v. A.C. is furnished to the running windings 24 through terminals 40 and 44, while similar electric power is supplied to the starting winding 26 through terminals 44, 46, and through a starting switch, not shown, of any well known construction, which serves to connect the starting winding in circuit until the motor attains its running speed, after which winding 26 is disconnected.

Figure 4:
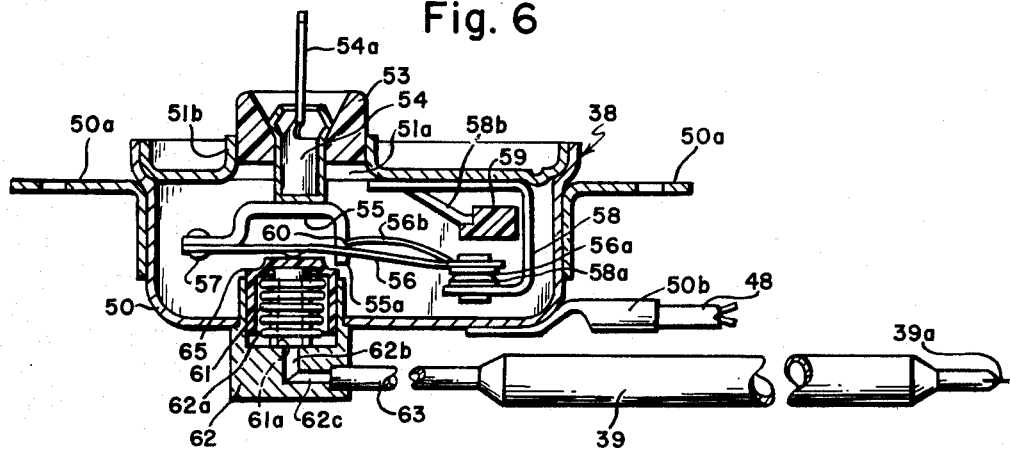
FIG. 4 is a longitudinal sectional view of the protector switch of FIG. 3 on an enlarged scale.

Referring to FIG. 4, motor protector switch 38 comprises a hermetically sealed metallic casing 50 which is generally rectangular in shape and includes a cover member 51. Casing 50 is provided with apertured ears or flanges 50a which aid in mounting the switch against the end turns of the motor windings. Switch 38 is conveniently mounted by tying or binding thereof to the windings with an insulating wrapping 52 as best shown in FIGS. 1 and 3, thereby placing it in insulated relation to the motor-compressor housing. Because switch 38 is itself hermetically sealed, the switch is unaffected by refrigerant and oil circulating within the motor-compressor unit.

A terminal member, which may be in the form of a soldering lug 50b, is connected directly to switch casing 50 and serves to connect conductor 48 to the switch. Cover 51 has an opening 51a defined by an outwardly turned neck formation 51b, the opening receiving a ceramic insulator bushing 53 having a cup shaped conductor member 54 secured therein. Conductor member 54 has its outer end formed into a blade type connector terminal 54a for connection to common conductor 43, while the portion of conductor member 54 within the casing supports a U-shaped bracket 55 forming part of a suitable snap switch mechanism.

In the form shown, the switch mechanism comprises a contact carrying spring arm 56 having one end secured to bracket 55 by rivets 57. The free end of arm 56 carries a movable contact 56a which is movable toward and from a fixed contact 58a of a U-shaped bracket 58 secured in electrically conducting relation to the underside of cover 51. A stop lug 58b, which is struck out from bracket 58 and has a cap 59 of insulating material, serves as a limit for movement of arm 56 and contact 56a away from contact 58a.

Contact arm 56 has a central opening therein through which a leg 55a of bracket 55 extends for cooperation with a bent tongue 56b, which is struck out from arm 56 and has one end engaged in a V notch 60 in leg 55a. Tongue 56b acts as a toggle spring and serves to impart a snap action to arm 56 when it is moved, by means described hereinafter, into and out of engagement with contact 58a for making and breaking a circuit therethrough. Thus, when arm 56 is moved upwardly as seen in the drawings, and as it passes through its dead center position with respect to notch 60, bowed tongue 56b will act on arm 56 to separate contact 56a from 58a with a snap movement and to bring the end of arm 56 into engagement with insulator 59. The spring tension of arm 56 inherently tends to cause it to move back through its dead center position so as to be snapped by tongue 56b to close contacts 56a and 58a.

Contact arm 56, the spring tension of which normally maintains contact 56a in engagement with contact 58a, may be shifted upwardly as viewed in the drawings, to separate the contacts in the snap acting manner described above by thermally responsive means secured to casing 50 and including the previously mentioned tubular member 39, a resiliently expansible bellows 61, a base member 62, and a capillary tube 63 connecting tubular element 39 with the base member. The base member 62, which is received in an opening in the bottom wall of casing 50, is conveniently secured therein as by brazing.

Base member 62 has cylindrical bore 62a in which bellows 61 is concentrically mounted. A passage 62b, in base member 62, communicates with the interior of the bellows 61 and terminates in an opening 62c. A cup shaped insulating member 65 is disposed in bore 62a in telescoping relation with base member 62 and surrounding bellows 61. Insulating member 65 provides a connection between bellows 61 and contact arm 56 for effecting movement of the latter in accordance with expansion and contraction of the bellows. Capillary tube 63 is secured by brazing in opening 62c so that the tubular member 39, capillary tube 63, and bellows 61 are all in communication and so as to electrically connect the tubular member to the casing 50.

The end of tubular thermal sensing member 39 opposite capillary tube 63 is sealed as at 39a and connected by soldering or the like to a wire forming part of winding 24. The bellows 61, capillary tube 63 and tubular member 39 are filled with a suitable liquid, such as glycerine, so that when the temperature of the liquid in the tubular member reaches approximately 230° F. the bellows will be expanded to a degree sufficient to shift contact arm 56 past the notch 60 and thereby snap open contacts 56a, 58a, to break the motor circuit. On cooling, the liquid contracts to a point at which the switch contacts 56a, 58a close due to contraction of the bellows, and which closing occurs at approximately 190° F. A core or plug 61a is disposed inside bellows 61 and serves to reduce the volume of fluid therein so that ambient temperature changes will have a minimum of effect on the movement of the bellows. Of course, the mentioned operating temperatures are given by way of example and are selected prior to final assembly of the switch at the factory to suit the particular circumstances in which the switch will be used.

The temperature sensing tubular member 39 is formed of an electrically conducting material such as a nickel silver alloy, and is of such wall thickness that the tubular member has substantially the same current carrying characteristics as the wire of the windings, and like the winding wire, is coated with a suitable electrical insulating varnish. As was mentioned previously, member 39 actually forms a turn or a part of a turn of the current carrying running winding 24 of the motor.

To this end, member 39 is laid in a slot 13a of the laminated pole structure and is buried or surrounded by the other conductors or wires forming the adjacent turns of the winding. Capillary tube 63 extends from between the end turns of the winding adjacent switch 38 to which it leads. Thus, the tubular member 39, which is supported in the same manner and attitude as the rest of the turns, is in intimate, heat transfer relation with the adjoining wires in the interior of winding 24, and forms an integral, current carrying part of the turns of the winding.

By way of example, the member 39 may be formed of the nickel silver alloy known in the art to which the invention pertains as nickel silver "Alloy A," and has an outside diameter of .090 inch, an inside diameter of .063 inch, and is approximately six inches long in active length. The heat rise curve of such a member and its enclosed liquid, at 30 amperes of current flow slightly leads the heat rise curve of a No. 17 copper wire when both are wound into a stator in the manner just described. Therefore, the sensing member 39 will be subjected to the same increases in temperature as are experienced by the adjacent turns of the winding, not only from heat transfer from the other turns, but also from heating due to internal resistance to the motor current flowing in the winding.

The small inside diameter and consequently the liquid volume of the sensing member 39 assures that the temperature lag of the body of liquid therein will be extremely small. In addition, the capillary tube 63 which is exposed to ambient temperatures, has a markedly smaller inside diameter and volume than does the sensing member 39, so that temperature changes of the liquid in the capillary tube have relatively little effect on the expansion of the bellows as compared with the effect caused by the temperature changes of the liquid in the member 39.

Figure 6:
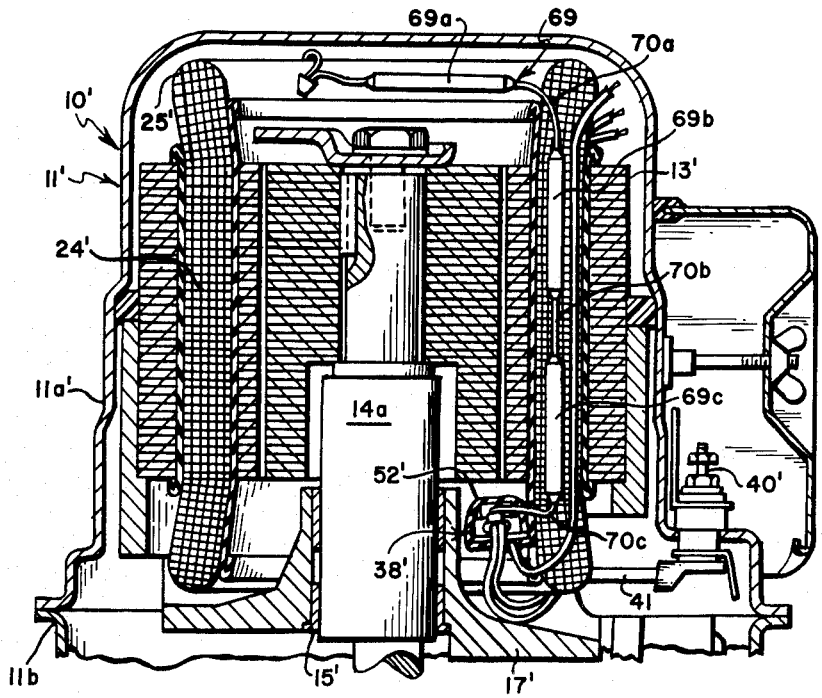
FIG. 6 is a fragmentary sectional view of a motor-compressor unit similar to that of FIG. 1 but embodying a different form of the invention.

In the form of the invention illustrated in FIG. 6, parts corresponding to parts in FIG. 1 are given corresponding reference numerals with a prime mark added. In this embodiment a temperature sensing element 69 having a plurality of tubular members 69a, 69b, and 69c, has replaced the temperature sensing member 39.

The tubular members 69a, 69b, and 69c are connected in series by capillary tube segments 70a, 70b, and 70c, the latter being connected to base 62' of protector switch 38'. The plurality of thermal sensing members are, like member 39, buried within the turns of the windings 24'. In this instance, however, one tubular member 69a is buried in the end turns 25' while the other tubular members 69b and 69c are buried in the slot turns of the windings 24'. The thermal sensing members of element 69 are filled with a thermally expansible liquid such as glycerine, and are independently adapted to operate switch 38' to open the motor circuit in the event overheating occurs in any of the portions of the windings 24', including the end turns 25'. This form of the invention provides particularly reliable protection in that the tubular sensing member 69a will cause switch 38' to open the motor circuit upon experiencing an inordinate increase in temperature in the end turns even through the lower portion of the windings containing member 69c be cooled as by being submerged in liquid refrigerant collected in housing 11'.

Referring now to FIG. 7, there is illustrated therein a horizontal motor compressor unit 90 in which the motor housing 91 is formed integrally with the block or frame of the compressor 92. In this form of motor compressor unit the refrigerant returns directly to compressor 93 through a tube 94 without passing through the motor housing, and therefore the housing 91 is provided with fins 91a for dissipating the heat developed by motor 95 therein. Motor 95 comprises a stator including a liminated pole structure 96, field windings 97, and a rotor 98 including a shaft 99. Shaft 99 is supported in bearings 100 and 101 and is provided with eccentrics for driving compressor pistons 102. In order to obviate the necessity of providing sealing means around shaft 99 between the compressor section and the motor section of housing 91, the motor is hermetically sealed within the housing as by a cover member 104. Because fins 91a are most effective in cooling the central portion of windings 97, the end turns 97a adjacent cylinder walls 106 have a tendency to become overheated by heat developed in the compressor and transmitted through the cylinder wall 106. Accordingly, in this form of the invention there is provided a thermal sensing element in the form of a tubular member 107 which is connected by a capillary tube 108 to a cut-out switch 110 corresponding to switch 38 of the embodiment of FIG. 1. Tubular temperature sensing member 107 is buried in the turns of winding 97 and is so disposed that a portion 107a of the tubular member is located in the end turns 97a adjacent compressor cylinder wall 106. This arrangement not only protects the motor windings against excessive temperature within the body of the windings 97, but also within the portion of the windings subjected to the most severe temperature conditions, namely the end turns 97a adjacent the compressor.

It will be appreciated from the foregoing detailed description of several embodiments of the present invention that there has been provided thereby protection means for motors forming part of sealed motor-compressor units which is adapted to respond to abnormal increases in temperatures and abnormal current flow in the interior portions of a motor winding, and which protection means is so constructed and arranged that its response is conditioned by a combination of such temperature and current conditions that it will deenergize the motor only when a dangerous temperature condition is approached.

More specifically, the operation of the thermally responsive switch means of this invention may be said to accurately reflect temperature conditions in that portion of the motor which is most prone to failure from abnormal conditions, namely the interior portions of the windings. For example in a refrigerating system, when the motor is running under an over-load and the windings 24 are carrying a current which would normally be dangerous to the inner turns thereof, but which turns dissipate sufficient heat to the outer turns which are cooled either by the returning refrigerant or by heat dissipating fins, the inner turns are in no danger of overheating and the temperature of thermostatic element 39 will be representative of those inner turns and hence the contacts 56a, 58a will not at that time be opened to interrupt the motor circuit. If, however, the temperature of the windings rises gradually to a dangerous degree, although there be a relatively small current flow, the expansion of fluid in the thermostatic element 39 will cause the bellows to open the switch contacts 56a, 58a to stop the motor. Likewise, in the case of a locked rotor where there is an almost instantaneous heavy current flow, the internal electrical resistance of element 19 will cause very rapid heating and expansion of the fluid therein and consequent rapid opening of the motor circuit. Thus, there has been provided by this invention an improved thermostatic protection means which provides a desirable combination of electrical heating effects and of heat transfer effects from one portion of the windings to another, and which, because of the use of a sensing element in the interior of the windings including the end turns thereof, is particularly adapted to protect a motor of a motor-compressor unit wherein a failure of normal cooling by returning refrigerant may occur, or wherein spot heating of turns adjacent the compressor section may occur.

Although the invention has been described with detailed reference to specific embodiments thereof and in connection with specific forms of motor-compressor units, it is understood that the invention is not limited thereto, but rather the invention includes all those modifications, adaptations, and uses as are reasonaby embraced by the scope of the claims hereof.

Having described our invention, we claim:

1. In an hermetically sealed motor-compressor unit comprising a refrigerant compressing portion and an electric motor portion including a field winding having a plurality of turns for carrying the motor current, said turns including straight intermediate portions extending axially of the motor and turned portions at the ends of said turns, motor protection means comprising:
    (a) a pressure responsive switch connected to control energization of said motor,
    (b) said switch comprising an hermetically sealed casing mounted within said unit,
    (c) one of said turns comprising a current carrying tubular member means containing thermally expansible fluid,
    (d) said tubular member means being connected by capillary tube means to said switch to effect opening thereof upon said tubular member means being heated to a predetermined temperature,
    and
    (e) said tubular member means being in close heat exchange relation and co-extending with the intermediate portion and an end portion of said winding.

2. In an hermetically sealed motor-compressor unit, motor protection means as defined in claim 1 and wherein said winding comprises slot turns and end turns, said tubular member means comprising a single tubular element having a central portion forming a slot turn and surrounded by other slot turns, and said element having an end portion forming an end turn and buried in other end turns.

3. In an hermetically sealed motor-compressor unit, protection means as defined in claim 2 and wherein said end portion is in the other end turns disposed nearest the refrigerant compressing portion of the motor-compressor unit.

4. In an hermetically sealed motor-compressor unit including a field winding having a plurality of turns for carrying the motor current, motor protection means comprising:
    (a) a normally closed pressure responsive switch connected to control energization of said motor,
    (b) said switch comprising an hermetically sealed casing mounted within said unit,
    (c) one of said turns comprising a plurality of current carrying tubular members containing thermally expansible fluid,
    (d) said tubular members being connected in series to said switch by capillary tube means,
    (e) said tubular members being buried among other winding turns with at least one tubular member being buried in end turns and at least one tubular member being buried in slot turns,
    and
    (f) said fluid being operative to open said switch upon any one of said tubular members being heated above a predetermined temperature.

5. In a motor-compressor unit having an electric motor section and a refrigerant compressor section hermetically sealed in a common housing having wall means between said sections, said motor section comprising a stator including a slotted core and a field winding for carrying motor current, said core having one end disposed adjacent said wall means, said winding comprising a plurality of wire turns having portions disposed in slots of said core and portions overlying said one end of said core, said winding further comprising at least a partial turn of an electrically conductive tubular element having a portion disposed among said portions of said wire turns in one of said slots and having an end portion disposed among the portions of said wire turns overlying said one end of said core, said tubular element being closed at one end and having its other end communicating through a capillary tube with an expansible power element, said tubular member, said capillary tube and said power element containing a thermally expansible fluid, normally closed switch means for controlling said motor current and operable by said power element to an open condition upon increase in temperature of said tubular element to a predetermined temperature, and said tubular element having substantially the same heat rise characteristics as the wire of said wire turns when subjected to the same electric current.

References Cited by the Examiner
UNITED STATES PATENTS

| | | | |
|---|---|---|---|
| 2,471,840 | 5/1949 | Seely | 310—68 |
| 2,712,083 | 6/1955 | Armstrong | 310—68 |
| 2,862,093 | 11/1958 | Lennox | 219—20 |

FOREIGN PATENTS

| | | |
|---|---|---|
| 1,046,760 | 12/1958 | Germany. |

MILTON O. HIRSHFIELD, *Primary Examiner.*